(12) United States Patent
Arahira

(10) Patent No.: US 8,923,517 B2
(45) Date of Patent: Dec. 30, 2014

(54) MULTI-TERMINAL QUANTUM KEY DISTRIBUTION SYSTEM

(71) Applicant: Oki Electric Industry Co., Ltd., Tokyo (JP)

(72) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 27 days.

(21) Appl. No.: 13/938,600

(22) Filed: Jul. 10, 2013

(65) Prior Publication Data

US 2014/0112478 A1  Apr. 24, 2014

(30) Foreign Application Priority Data

Oct. 22, 2012 (JP) ................................. 2012-232848

(51) Int. Cl.
*H04L 9/00* (2006.01)
*H04L 9/08* (2006.01)

(52) U.S. Cl.
CPC .................................. *H04L 9/0852* (2013.01)
USPC ............................ 380/278; 380/256; 359/330

(58) Field of Classification Search
CPC ........ H09L 9/0852; H04B 10/70; G02F 1/395
USPC .................... 380/278, 256; 359/330
See application file for complete search history.

(56) References Cited

U.S. PATENT DOCUMENTS

2009/0180616 A1* 7/2009 Brodsky et al. ............... 380/256
2012/0051740 A1* 3/2012 Arahira ........................... 398/28
2012/0051755 A1* 3/2012 Arahira ......................... 398/158

FOREIGN PATENT DOCUMENTS

JP     2012-004955 A    1/2012
JP     2012-049890 A    3/2012

OTHER PUBLICATIONS

Shin Arahira et al., "Generation of polarization entangled photon pairs at telecommunication wavelength using cascaded $\chi^2$ processes in a periodically poled LiNbO$_3$ ridge waveguide", Optics Express, vol. 19, No. 17, pp. 16032-16043, Aug. 15, 2011.

\* cited by examiner

*Primary Examiner* — Saleh Najjar
*Assistant Examiner* — Oleg Korsak
(74) *Attorney, Agent, or Firm* — Rabin & Berdo, P.C.

(57) ABSTRACT

A quantum entangled photon pair generating device, an optical frequency dividing filter, a 2N-input/2N-output optical switch, a 2N number of quantum key receiving devices, an optical transmission path and a control unit are provided. The quantum entangled photon pair generating device generates quantum entangled photon pairs. The optical frequency dividing filter receives the quantum entangled photon pairs, divides an optical frequency region by 2N, and performs output. The 2N-input/2N-output optical switch allocates photons of the 2N number of optical frequency regions to any one of a 2N number of output ports, and outputs the photons. Each of the 2N quantum key receiving devices performs photon detection, uses a signal processing circuit of the quantum key receiving device to transmit measurement basis information to generate a quantum encryption key and to receive measurement basis information sent from the other quantum key receiving devices, and further, performs error correction and privacy amplification.

4 Claims, 3 Drawing Sheets

MULTI-TERMINAL QUANTUM KEY DISTRIBUTION SYSTEM

CROSS REFERENCE TO RELATED APPLICATION(S)

This application is based upon and claims benefit of priority from Japanese Patent Application No. 2012-232848, filed on Oct. 22, 2012, the entire contents of which are incorporated herein by reference.

BACKGROUND

The present invention relates to a quantum key distribution system using a quantum entangled photon pair. More specifically, the present invention relates to a multi-terminal quantum key distribution system which makes it possible to perform quantum key distribution between two given terminals among a plurality of terminals, and which makes it possible to simultaneously perform quantum key distribution between a plurality of sets of two terminals.

A quantum encryption communication system is expected to achieve ultimate secure communication, and it is expected that the quantum encryption communication system will be applied to future high-security information communication systems. Here, in order to achieve safe communication without information leakage, it is necessary for a sender and a receiver to share an encryption key, which is used to encode and decode information, such that the encryption key is not known by a third party, such as an eavesdropper.

The quantum key distribution system is attracting attention as an encryption key distribution system in which ultimate unconditional security is guaranteed by the laws of quantum physics, and recently, research and development of the quantum key distribution system is being actively carried out in order for it to be applied to future high-security information communication systems (refer to, for example, Japanese Patent Application Publication No. JP-A-2012-049890 or Japanese Patent Application Publication No. JP-A-2012-004955).

A practical quantum key distribution system is achieved by using a single photon generating device that generates one photon per pulse, or a quantum entangled photon pair generating device that generates one pair of quantum entangled photons per pulse.

When the single photon generating device is used, the sender generates a single photon and the receiver receives it using a single photon detector. After that, the sender and the receiver share a final encryption key through processes including the exchange of information about a measurement basis, error correction and privacy amplification. Privacy amplification is a technology that appropriately discards and shortens a bit stream that has become partially known to an eavesdropper, and thereby generates a secure secret key in terms of information theory.

On the other hand, when the quantum entangled photon pair generating device is used, the sender and the receiver (hereinafter, these are sometimes collectively referred to as a sender/receiver) respectively receive one of a pair of quantum entangled photons using the single photon detector, and thereby share the encryption key.

SUMMARY

Here, a case is assumed in which there are a plurality of senders and receivers who wish to share the encryption key. Let us consider a case in which a key sharing session (a series of communication processes to share the encryption key) is performed by given sets of the plurality of senders/receivers in order for different sets of the senders/receivers to simultaneously share the encryption key.

It is possible to perform the above-described session in the quantum key distribution system using the single photon generating device. Specifically, the sender/receiver who shares the encryption key prepares a transmitting/receiving terminal that includes both the single photon generating device and the single photon detector. Then, the sender/receiver performs each session while fulfilling the role of either single photon generation or single photon reception for each of the encryption key sharing sessions. At this time, it is sufficient that each of the sender and the receiver who form a pair fulfills the role of either the single photon reception or the single photon generation. Since the sender/receiver fulfills the role of either the sender or the receiver for each session, the transmitting/receiving terminal is required that includes both the single photon generating device and the single photon detector.

Thus, in the above-described quantum encryption communication system, it is necessary for each terminal to include both the single photon generating device and the single photon detector. As a result, the cost of the system is increased and the size of the system is also increased.

In a similar manner, in the quantum key distribution system that uses the quantum entangled photon pair generating device, the transmitting/receiving terminal is required that includes both the quantum entangled photon pair generating device and the single photon detector that receives one of a pair of quantum entangled photons.

Therefore, in realizing the quantum encryption communication system, there is a demand to allow quantum key distribution to be easily performed between given terminals among the plurality of terminals, with a simple configuration and at low cost. Further, it is desirable to achieve a multi-terminal quantum key distribution system that makes it possible to simultaneously perform quantum key distribution between the plurality of terminals.

The inventor of the present application considered preparation of a quantum entangled photon pair generating device that generates entangled photon pairs across an optical frequency region of 2Nf Hz or more. The inventor focused attention on the fact that, if the quantum entangled photon pair generating device is structured such that photon pairs output from the quantum entangled photon pair generating device are divided, by a frequency dividing filter, into a 2N number of frequency regions having different wavelengths, and such that the photon pairs of the divided frequency regions are input from a 2N number of input ports of an optical switch that includes the 2N number of input ports and a 2N number of output ports, and the photon pairs are output from the output ports by appropriately selecting the 2N number of output ports, it is possible to structure a mechanism that transmits the photon pairs to a 2N number of quantum key receiving devices, respectively, and it is possible to perform quantum key distribution between given terminals among the plurality of terminals. The inventor was convinced that it is possible to simultaneously perform quantum key distribution between the plurality of terminals.

Further, as a result of diligent research performed by the inventor of the present application, the inventor found that it is possible to achieve a system in which the sender and the receiver who share the quantum encryption key share one of the 2N number of quantum key receiving devices and the quantum encryption key can be shared by any two users among 2N users having the quantum key receiving devices.

Therefore, it is desirable to provide a multi-terminal quantum key distribution system which makes it possible to perform quantum key distribution between given terminals among a plurality of terminals and which makes it possible to simultaneously perform quantum key distribution between the plurality of terminals.

According to an embodiment of the present invention, a multi-terminal quantum key distribution system having the following configuration is provided. Hereinafter, N is an integer of two or more, and f bit/s is an assumed maximum key generation rate of a quantum encryption key.

According to the multi-terminal quantum key distribution system of the embodiment of the present invention includes a quantum entangled photon pair generating device, an optical frequency dividing filter, a 2N-input/2N-output optical switch, a 2N number of quantum key receiving devices and a control unit.

The quantum entangled photon pair generating device generates quantum entangled photon pairs having an optical frequency region of at least 2Nf Hz.

The optical frequency dividing filter has a 2N number of output ports, receives the quantum entangled photon pairs output from the quantum entangled photon pair generating device, divides the optical frequency region by 2N, and outputs photons from the 2N number of output ports.

The 2N-input/2N-output optical switch receives the photons of the 2N number of optical frequency regions output from the 2N number of output ports of the optical frequency dividing filter, allocates each of the photons of the 2N number of optical frequency regions to any one of the 2N number of output ports, and outputs the photons.

Each of the 2N number of quantum key receiving devices detects each of the photons of the 2N number of optical frequency regions output from the 2N-input/2N-output optical switch. Further, each of the 2N number of quantum key receiving devices includes a signal processing circuit, and the signal processing circuit detects each of the photons of the 2N number of optical frequency regions output from the 2N-input/2N-output optical switch. Along with the detection by the signal processing circuit, the signal processing circuit receives measurement basis information that is sent from the other quantum key receiving devices via a classical channel, sends the measurement basis information to the other quantum key receiving devices via the classical channel, determines time information at which measurement bases of a sender and a receiver match, sends the determined time information to the other quantum key receiving devices via the classical channel, and generates a sifted key by leaving only bits of photons measured at a time at which the measurement bases match.

The control unit controls an operation of the 2N-input/2N-output optical switch, and controls a sifted key generation process in each of the quantum key receiving devices through the classical channel.

According to the multi-terminal quantum key distribution system of the embodiment of the present invention, quantum entangled photon pairs across an optical frequency region of 2Nf Hz or more are provided by the quantum entangled photon pair generating device. The optical frequency region of the quantum entangled photon pairs is divided by 2N by the optical frequency dividing filter, the quantum entangled photon pairs being output from the quantum entangled photon pair generating device. Each of the quantum entangled photon pairs that have been divided by 2N is allocated by the 2N-input/2N-output optical switch to any one of the 2N number of output ports, and is output.

The output quantum entangled photon pairs are transmitted to the 2N number of quantum key receiving devices, and a sender/receiver who has a transmitting/receiving terminal including the quantum key receiving device that has received a quantum entangled photon pair becomes a sender/receiver who shares the quantum encryption key and performs an encrypted communication session. Further, the signal processing circuit included in the quantum key receiving device receives measurement basis information that is sent from the other quantum key receiving devices via a classical channel, sends the measurement basis information to the other quantum key receiving devices via the classical channel, determines time information at which measurement bases of a sender and a receiver match, sends the determined time information to the other quantum key receiving devices via the classical channel, and generates a sifted key by leaving only a photon bit measured at a time at which the measurement bases match. Thus, according to the multi-terminal quantum key distribution system of the embodiment of the present invention, simultaneous quantum key distribution is achieved.

DETAILED DESCRIPTION OF THE EMBODIMENT(S)

Figure 1:
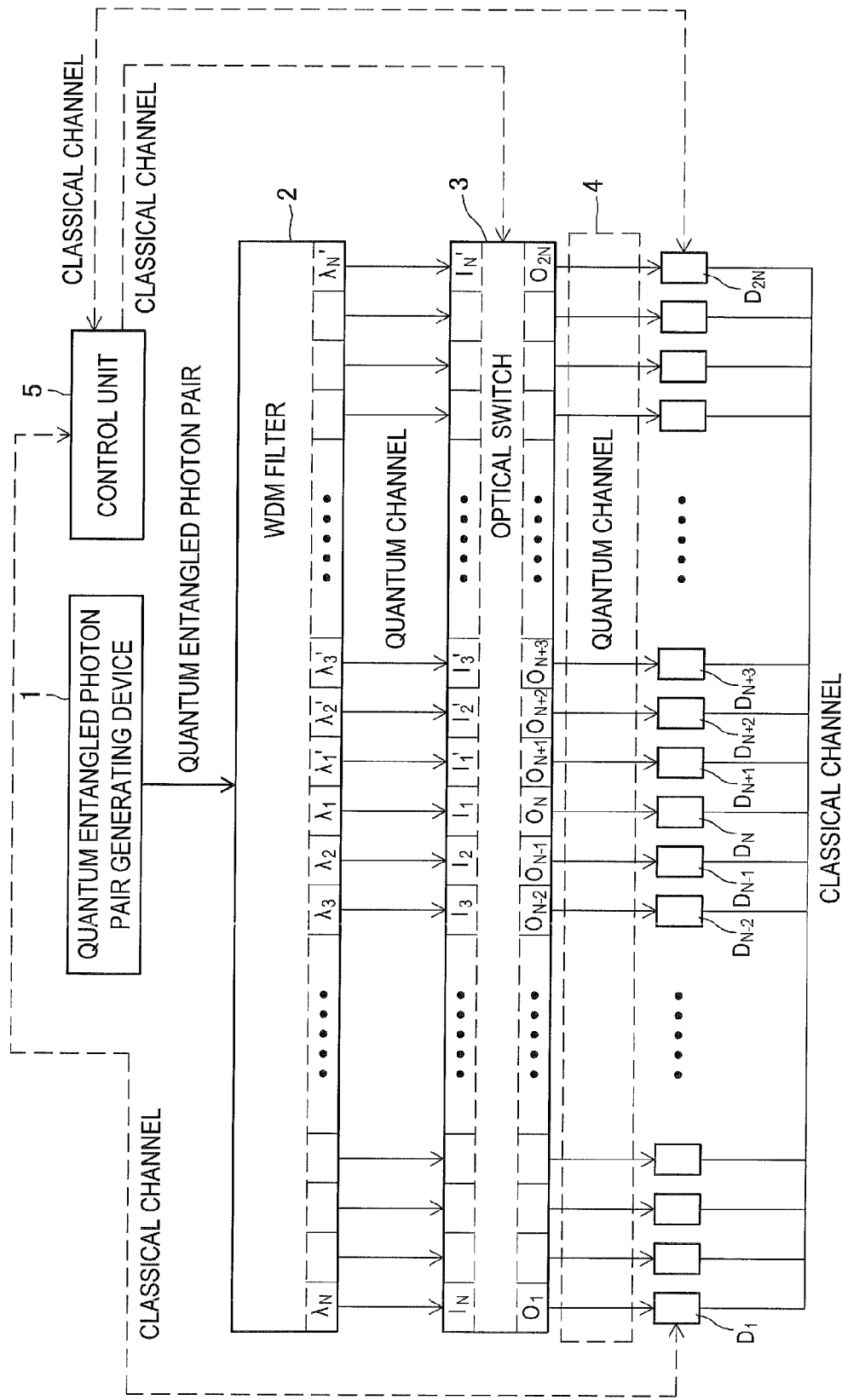
FIG. 1 is a block configuration diagram schematically showing a basic configuration of a multi-terminal quantum key distribution system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Figure 2:
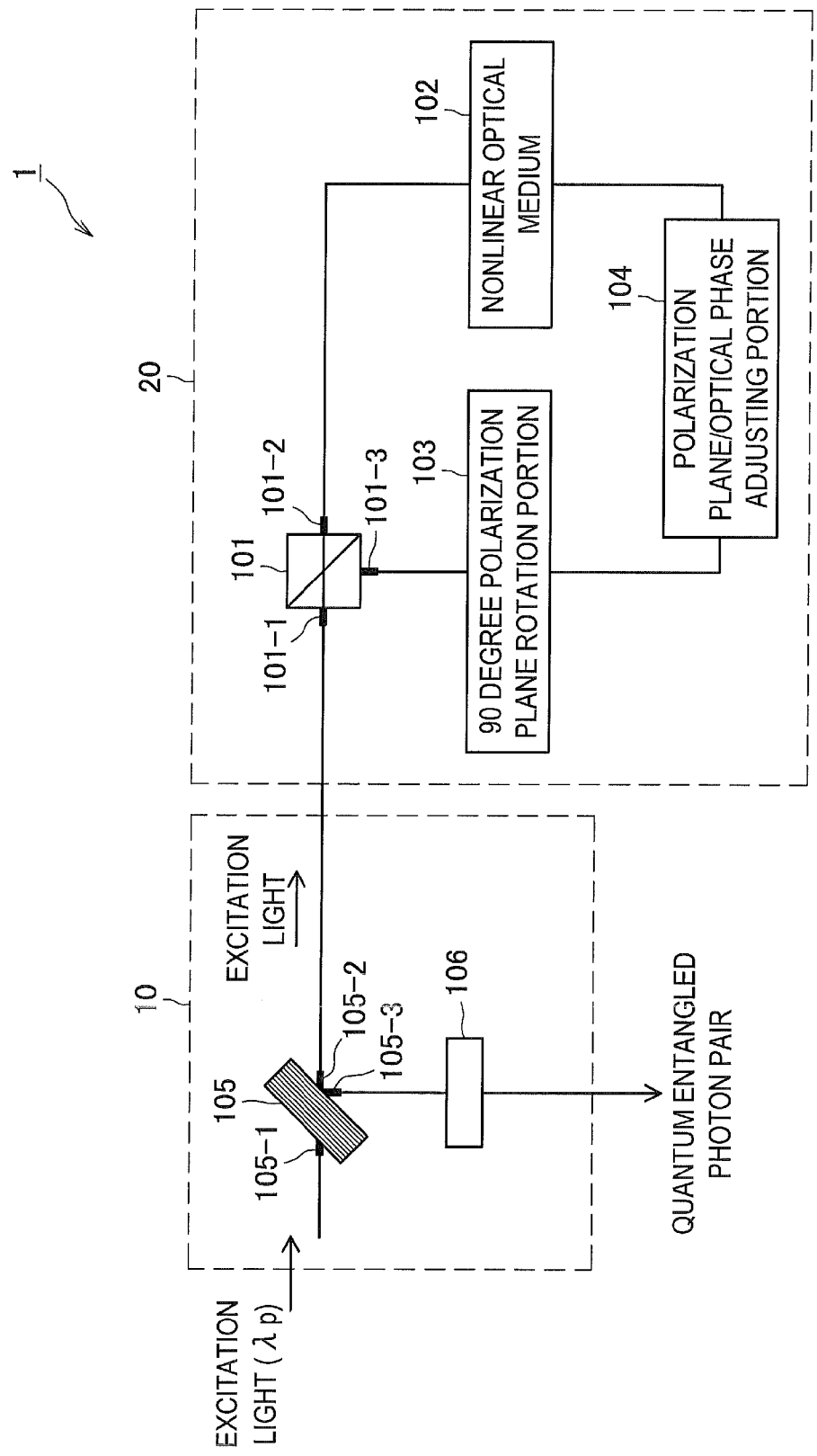
FIG. 2 is a diagram illustrating a schematic configuration and operations of a polarization entangled photon pair generating device.

Hereinafter, an embodiment of the present invention will be explained with reference to FIG. 1 to FIG. 3. Although specific elements and operation conditions and the like are used in the explanation below, these elements and operation conditions are merely preferable examples, and thus the present invention is not limited to those examples.

Basic configuration of multi-terminal quantum key distribution system

A basic configuration of a multi-terminal quantum key distribution system according to the embodiment of the present invention will be explained with reference to FIG. 1. The multi-terminal quantum key distribution system is provided with a quantum entangled photon pair generating device 1, an optical frequency dividing filter (a wavelength-division multiplexing (WDM) filter) 2, a 2N-input/2N-output optical switch 3, a 2N number of quantum key receiving devices $D_1$ to $D_{2N}$, an optical transmission path (a quantum channel) 4 and a control unit 5.

The quantum entangled photon pair generating device 1 generates quantum entangled photon pairs. If an assumed maximum key generation rate of a quantum encryption key to be generated is f bit/s and the number of terminals that share the quantum encryption key is 2N, the optical frequency band of the quantum entangled photon pairs is 2Nf Hz or more. Here, sets of two terminals to be connected that are formed by selecting two terminals from among a 2N number of terminals are N sets in total, and a key sharing session can be performed by the N sets.

The assumed maximum key generation rate of the quantum encryption key is a smaller value of the following frequencies: a repetition frequency of an excitation light pulse light source that is used to generate quantum entangled photon pairs; and a repetition frequency of a periodic gate of a single photon detector that receives photons. This corresponds to a value obtained by dividing a photon detection rate when all the quantum entangled photon pairs can be detected by the single photon detector without any loss, by an average number of photons per pulse.

Quantum entangled photon pairs across the optical frequency region of 2 Nf Hz or more are output from the quantum entangled photon pair generating device 1. It is assumed that the optical frequency region includes at least regions $[(-f/2)+F_N']$ to $[(f/2)+F_1']$ and regions $[(-f/2)+F_1]$ to $[(f/2)+F_N]$.

This type of quantum entangled photon pair generating device can be achieved by using current optical device technology. For example, from a periodically poled lithium niobate (PPLN: Periodically Poled LiNbO$_3$) waveguide having a length of 6 cm, it is possible to generate parametric down-converted light of a wavelength region of approximately 60 nm in a 1550 nm band (refer to non-patent literature: S. Arahira, et al., "Generation of polarization entangled photon pairs at telecommunication wavelength using cascaded $\chi^{(2)}$ processes in a periodically poled LiNbO$_3$ ridge waveguide", Optics Express vol. 19, No. 17, pp. 16032-16043, 2011).

As an example of the quantum entangled photon pair generating device 1, a schematic configuration and operations of a polarization entangled photon pair generating device will be explained with reference to FIG. 2. The polarization entangled photon pair generating device shown in FIG. 2 is provided with a loop optical path 20 of a Sagnac interferometer that includes a polarization splitter/combiner 101 and two input/output terminals of the polarization splitter/combiner 101, and an optical branching input/output portion 10 that inputs excitation light into the loop optical path 20 and also spatially separates and outputs wavelength components of polarization entangled photon pairs that are output from the loop optical path 20.

The loop optical path 20 is formed such that a nonlinear optical medium 102, a polarization plane/optical phase adjusting portion 104 and a 90 degree polarization plane rotation portion 103 are arranged and connected in series by an optical fiber, and such that both ends of the optical fiber are connected to a second input/output terminal 101-2 and a third input/output terminal 101-3 of the polarization splitter/combiner 101 that include a first input/output terminal 101-1, the second input/output terminal 101-2 and the third input/output terminal 101-3.

The optical branching input/output portion 10 includes a band-pass optical filter 105 and a low-pass optical filter 106. The band-pass optical filter 105 is provided with a first input/output terminal 105-1, a second input/output terminal 105-2 and a third input/output terminal 105-3. Excitation light whose wavelength is $\lambda_p$ is input to the band-pass optical filter 105 from the first input/output terminal 105-1. Then, through the band-pass optical filter 105, the excitation light is input to the loop optical path 20 from the first input/output terminal 101-1 of the polarization splitter/combiner 101.

When the excitation light is input to the loop optical path 20 via the optical branching input/output portion 10 such that the excitation light propagates clockwise and counter-clockwise in the loop optical path 20, a correlated photon pair, which is formed by signal light and idler light that propagate clockwise and counter-clockwise in the loop optical path 20, is generated due to a nonlinear optical effect in the nonlinear optical medium 102 based on the excitation light. The correlated photon pair is output from the first input/output terminal 101-1 of the polarization splitter/combiner 101 that is included in the loop optical path 20. Then, the correlated photon pair is input from the second input/output terminal 105-2 of the band-pass optical filter 105 and is output, as a quantum entangled photon pair, from the third input/output terminal 105-3 via the low-pass optical filter 106 provided in the optical branching input/output portion 10.

The low-pass optical filter 106 functions to remove wavelength components of second harmonic generation (SHG) light that is generated in the nonlinear optical medium 102. The nonlinear optical medium 102 is either a nonlinear optical medium that effectively exhibits a second-order nonlinear optical effect, such as PPLN, or a nonlinear optical medium that effectively exhibits a third-order nonlinear optical effect, such as an optical fiber. In either case, a nonlinear optical medium that generates parametric fluorescence by excitation light is adopted.

When a second-order nonlinear optical medium is adopted as the nonlinear optical medium 102, it is possible to generate correlated photon pairs by a cascade second harmonic generation/spontaneous parametric down-conversion (SHG/SPDC) process. More specifically, if the excitation light whose wavelength is $\lambda_p$ is used, SHG light whose wavelength is $\lambda_p/2$ is generated in the second-order nonlinear optical medium. Through the SPDC process that uses the SHG light as seed light, correlated photon pairs of signal light whose wavelength is $\lambda_s$ and of idler light whose wavelength is $\lambda_i$ are generated simultaneously at the spatially same position, namely, generated simultaneously in the same space. Quantum entangled photon pairs output from the quantum entangled photon pair generating device 1 are sent to the optical frequency dividing filter 2.

The optical frequency dividing filter 2 will be explained. The optical frequency dividing filter 2 is a filter that divides light output from the quantum entangled photon pair generating device 1 into a 2N number of optical frequency regions and outputs the divided light.

Center wavelengths of the output light that is divided into the 2N number of optical frequency regions and output are denoted as $\lambda_N, \lambda_{N-1}, \ldots \lambda_2, \lambda_1, \lambda_1', \lambda_2', \ldots \lambda_{N-1}', \lambda_N'$, in an ascending order of wavelength. Further, optical frequencies that correspond to the respective center wavelengths are denoted as $F_N, F_{N-1}, \ldots F_2, F_1, F_1', F_2', \ldots F_{N-1}', F_N'$. In order to uniformize the generation rate of final encryption keys that are generated by the respective key sharing sessions, it is most desirable that each of the divided frequency regions respectively has the same optical frequency bandwidth. However, it is not essential to satisfy this condition when the multi-terminal quantum key distribution system according to the embodiment of the present invention is constructed. Note, however, that it is assumed that the optical frequency bandwidth of each of the frequency regions is f Hz or more when it is expressed as an optical frequency. Further, the center wavelengths and the center optical frequencies of the output light that is divided and output are set to satisfy the following Formulas (1-1) and (1-2).

(Wavelength region)
$$\frac{1}{\lambda_1} + \frac{1}{\lambda_1'} = \frac{1}{\lambda_2} + \frac{1}{\lambda_2'} = \ldots = \frac{1}{\lambda_N} + \frac{1}{\lambda_N'} \quad (1\text{-}1)$$

(Optical frequency region)
$$F_1 + F_1' = F_2 + F_2' = \ldots = F_N + F_N' \quad (1\text{-}2)$$

For example, a wavelength selecting filter (a wavelength-division multiplexing (WDM) filter) that utilizes an arrayed waveguide grating (AWG) can be used as the optical frequency dividing filter that divides and outputs the input light as described above. The AWG is configured such that two N×N star couplers are arranged, and an N number of waveguides, which have different optical path lengths 0, $\Delta L$, $2\Delta L$, ..., (N–1)$\Delta L$, are connected between the two N×N star couplers. The AWG is an optical device that can branch, simultaneously for each wavelength, a wavelength multiplexing optical signal that is N wavelength-multiplexed by multibeam interference of the N number of waveguides.

The 2N-input/2N-output optical switch 3 will be explained. The 2N-input/2N-output optical switch 3 is an optical switch that includes a 2N number of input ports $I_N$, $I_{N-1}, \ldots I_2, I_1, I_1', I_2', \ldots I_{N-1}', I_N'$, and a 2N number of output ports $O_1, O_2, \ldots O_{N-2}, O_{N-1}, O_N, O_{N+1}, O_{N+2}, O_{N+3}, \ldots O_{2N}$. Here, the input ports $I_N, I_{N-1}, \ldots I_2, I_1, I_1', I_2', \ldots I_{N-1}', I_N'$ are connected, via quantum channels, to the output ports whose respective center wavelengths of the optical frequency dividing filter 2 are $\lambda_N, \lambda_{N-1}, \ldots \lambda_2, \lambda_1, \lambda_1', \lambda_2', \ldots \lambda_{N-1}', \lambda_N'$. Further, the input light that is input from the input ports $I_N$, $I_{N-1}, \ldots I_2, I_1, I_1', I_2', \ldots I_{N-1}', I_N'$ is respectively output from the output ports $O_1, O_2, \ldots O_{2N}$ by appropriately selecting the output ports by a switching function of the 2N-input/2N-output optical switch 3. A preferable switch can be selected from commercially available optical switches and used as an optical switch having this type of function.

The output light output from the output ports $O_1, O_2, \ldots O_{N-2}, O_{N-1}, O_N, O_{N+1}, O_{N+2}, O_{N+3}, \ldots O_{2N}$ propagates, appropriately, through free space and the optical transmission path 4, such as an optical fiber transmission network. After that, the output light is received by the quantum key receiving devices $D_1, D_2, \ldots D_{N-2}, D_{N-1}, D_N, D_{N+1}, D_{N+2}, D_{N+3}, \ldots D_{2N}$ that each include the single photon detector.

The control unit 5 will be explained. The control unit 5 is a control unit that performs switching operations of the 2N-input/2N-output optical switch 3, collection of basis selection information in the quantum key receiving devices $D_1$, $D_2, \ldots D_{2N}$, and a subsequent error correction process.

Operation principle of multi-terminal quantum key distribution system

Here, it is assumed that a general wavelength grid for wavelength division multiplexing optical communication is used and f=50 GHz (which corresponds to a wavelength of 0.4 nm). In this case, if the PPLN waveguide having a length of 6 cm is used and parametric down-converted light of a wavelength region of approximately 60 nm is generated in the 1550 nm band, approximately N=60 nm/(2×0.4 nm)=75 sets of users can be accommodated.

As disclosed in the above-described non-patent literature, if the PPLN waveguide having a length of 6 cm, for example, and the AWG type wavelength selecting filter etc. are used to form an optical interferometer of the Sagnac interferometer type, it is possible to create a quantum entangled photon pair generating device that outputs quantum entangled photon pairs having broadband parametric down-converted light spectral components of the PPLN waveguide.

Next, the quantum entangled photon pairs that are output from the quantum entangled photon pair generating device 1 are input to the optical frequency dividing filter 2. Thus, optical frequency-divided (wavelength-divided) quantum entangled photon pairs, whose center wavelengths are $F_N$, $F_{N-1}, \ldots F_2, F_1, F_1', F_2', \ldots F_{N-1}', F_N'$ and whose respective bands are f Hz or more, are respectively output from the respective output ports of the optical frequency dividing filter 2.

The 2N number of wavelength-divided output lights output from the optical frequency dividing filter 2 are respectively input to the 2N number of input ports $I_N, I_{N-1}, \ldots I_2, I_1, I_1'$, $I_2', \ldots I_{N-1}', I_N'$ of the 2N-input/2N-output optical switch 3, and then output from the 2N number of output ports $O_1$, $O_2, \ldots O_{N-2}, O_{N-1}, O_N, O_{N+1}, O_{N+2}, O_{N+3}, \ldots O_{2N}$. These output lights are received by the quantum key receiving devices $D_1, D_2, \ldots D_{N-2}, D_{N-1}, D_N, D_{N+1}, D_{N+2}, D_{N+3}, \ldots D_{2N}$ that each include the single photon detector, after they are transmitted through the optical transmission path 4. The sender/receiver who has one of the quantum key receiving devices $D_1, D_2, \ldots D_{2N}$ and has a transmitting/receiving terminal including the quantum key receiving device that has received a quantum entangled photon pair becomes a sender/receiver who shares the quantum encryption key and performs a key sharing session.

Here, it is assumed that the quantum entangled photon pair generating device 1 generates quantum entangled photon pairs by utilizing a parametric fluorescence process, such as spontaneous four-wave mixing or spontaneous parametric down-conversion. If the wavelength (frequency) of excitation light at that time is denoted as $\lambda_p(F_p)$, it is assumed that the wavelength of the excitation light and wavelength division characteristics of the optical frequency dividing filter 2 are designed such that (I) in the case of spontaneous four-wave mixing or cascade spontaneous parametric down-conversion, the following Formulas (2-1) and (2-2) are satisfied, and such that (II) in the case of spontaneous parametric down-conversion, the following Formulas (3-1) and (3-2) are satisfied.

(Wavelength region)
$$\frac{2}{\lambda_p} = \frac{1}{\lambda_1} + \frac{1}{\lambda_1'} = \frac{1}{\lambda_2} + \frac{1}{\lambda_2'} = \ldots = \frac{1}{\lambda_N} + \frac{1}{\lambda_N'} \quad (2\text{-}1)$$

(Optical frequency region)
$$2F_p = F_1 + F_1' = F_2 + F_2' = \ldots = F_N + F_N' \quad (2\text{-}2)$$

(Wavelength region)
$$\frac{1}{\lambda_p} = \frac{1}{\lambda_1} + \frac{1}{\lambda_1'} = \frac{1}{\lambda_2} + \frac{1}{\lambda_2'} = \ldots = \frac{1}{\lambda_N} + \frac{1}{\lambda_N'} \quad (3\text{-}1)$$

(Optical frequency region)
$$F_p = F_1 + F_1' = F_2 + F_2' = \ldots = F_N + F_N' \quad (3\text{-}2)$$

At this time, from the energy conservation law, a set of center wavelengths $(\lambda_k\text{-}\lambda_k')$ is a set as a quantum entangled photon pair. Meanwhile, a set of center wavelengths $(\lambda_k\text{-}\lambda_m')$ is not a quantum entangled photon pair, and is a photon pair in which Einstein-Podolsky-Rozen (EPR) correlation does not exist. Here, k=1, 2, ..., N, and m=1, 2, ..., N. Further, k≠m.

Therefore, the sender/receiver who receives the set of center wavelengths $(\lambda_k\text{-}\lambda_k')$ can generate an encryption key. Meanwhile, when the set of $(\lambda_k\text{-}\lambda_m')$ is received, it is not possible to generate an encryption key.

The sender/receiver who finally shares the encryption key is the sender/receiver having one of the quantum key receiving devices $D_1, D_2, \ldots D_{2N}$. Therefore, in order for two persons among the senders/receivers having the quantum key receiving devices to share the encryption key, an optical signal may be transmitted so that the two persons can receive the set of center wavelengths ($\lambda_k$-$\lambda_k'$). If the 2N-input/2N-output optical switch 3 is controlled and for example, a photon of wavelength $\lambda_1$ is transmitted to the quantum key receiving device $D_1$ and a photon of wavelength $\lambda_1'$ is transmitted to the quantum key receiving device $D_N$, the senders/receivers having the quantum key receiving devices $D_1$ and $D_N$ can share the quantum key. In a similar manner, if the operation setting of the 2N-input/2N-output optical switch 3 is performed such that a photon of wavelength $\lambda_1$ is transmitted to the quantum key receiving device $D_1$ and a photon of wavelength $\lambda_1'$ is transmitted to the quantum key receiving device $D_2$, the senders/receivers having the quantum key receiving devices $D_1$ and $D_2$ can share the quantum key. In summary, according to the multi-terminal quantum key distribution system of the embodiment of the present invention, the quantum key can be shared by any two persons among the 2N users having the quantum key receiving devices.

On the other hand, it is also possible to share the quantum key using a combination other than the set of wavelengths ($\lambda_1$-$\lambda_1'$), depending on how the operation setting of the 2N-input/2N-output optical switch 3 is performed. A quantum entangled photon pair of the set of wavelengths ($\lambda_1$-$\lambda_1'$) has no correlation with the other sets of quantum entangled photon pairs. As a result, it is possible to share the quantum key such that there is no information leakage among the N sets of users.

The control unit 5 controls the operation of the 2N-input/2N-output optical switch 3 in order to determine a combination of users who share the quantum key. Further, the control unit 5 is used to collect the basis selection information in the quantum key receiving devices $D_1, D_2, \ldots D_{2N}$ via classical channels, and controls sifted key generation and a subsequent error correction process.

Assuming a case in which polarization entangled photon pairs are received, a configuration example of functional parts of the quantum key receiving device that perform photon detection will be explained with reference to FIG. 3. The functional parts that perform photon detection include a half mirror 201, a first polarization separation element 203, a (1-1) single photon detector 205, a (1-2) single photon detector 206, a second polarization separation element 204, a (2-1) single photon detector 207, a (2-2) single photon detector 208, a ½ wavelength plate 202 and a signal processing circuit 209.

The arriving photons are probabilistically separated into two optical paths by the half mirror 201. Photons that proceed along one of the optical paths are input to the first polarization separation element 203, and photons that proceed along the other optical path pass through the ½ wavelength plate 202 and are input to the second polarization separation element 204.

The photons input to the first polarization separation element 203 are probabilistically polarization-separated such that s-polarized photons are input to the (1-1) single photon detector 205 and p-polarized photons are input to the (1-2) single photon detector 206. Meanwhile, the photons input to the second polarization separation element 204 are probabilistically polarization-separated such that p-polarized photons are input to the (2-1) single photon detector 207 and s-polarized photons are input to the (2-2) single photon detector 208. In summary, the arriving photons are finally input to one of the (1-1) single photon detector 205, the (1-2) single photon detector 206, the (2-1) single photon detector 207 and the (2-2) single photon detector 208.

Figure 3:
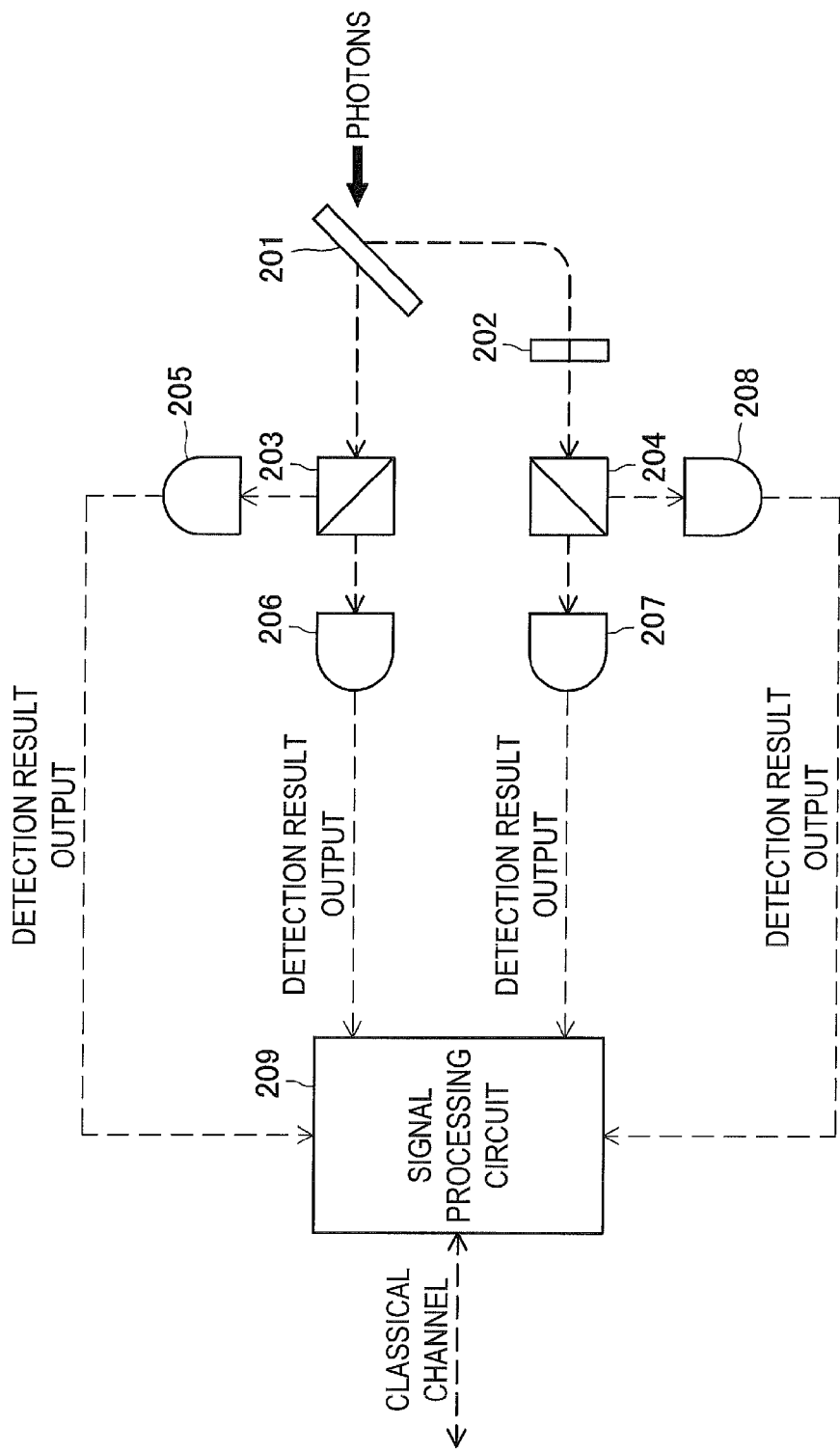
FIG. 3 is a block configuration diagram schematically showing a basic configuration of functional parts of a quantum key receiving device that perform photon detection.

Since the quantum key receiving device has the configuration shown in FIG. 3, the measurement basis is automatically selected by the half mirror 201 and the ½ wavelength plate 202. That is, when a photon is detected by the (1-1) single photon detector 205 or by the (1-2) single photon detector 206, the measurement basis is a horizontal-vertical polarization basis. Meanwhile, when a photon is detected by the (2-1) single photon detector 207 or the (2-2) single photon detector 208, the measurement basis is a 45 degree angle basis. In summary, the quantum key receiving device can acquire the measurement basis information in accordance with which of the (1-1) to (2-2) single photon detectors detects a photon.

Then, via a classical channel, the senders/receivers transmit the measurement basis information to the control unit 5 via the signal processing circuit 209. Further, the signal processing circuit 209 determines time information at which the measurement bases of the senders/receivers match, and transmits the measurement basis information to each of the senders/receivers via the control unit 5 using the classical channel. When the measurement bases match (for example, the horizontal-vertical polarization basis), the senders/receivers are sure to detect photons using the same single photon detector (the (1-1) single photon detector 205 or the (1-2) single photon detector 206 in the case of the horizontal-vertical polarization basis). Therefore, for example, if bit "1" is set when the (1-1) single photon detector 205 detects a photon and if bit "0" is set when the (1-2) single photon detector 206 detects a photon, it is possible to share the bit stream.

Based on this, after a key distillation process (a process that excludes a bit for which there is a possibility of eavesdropping), such as error correction or privacy amplification, is performed by mutual communication and signal processing via the classical channel between the control unit 5 and the signal processing circuit 209, it is possible to share the final quantum encryption key. Of course, this type of process can also be performed by the sender and the receiver directly performing mutual communication without using the control unit 5. In this case, a part of the functions of the control unit 5, such as the exchange of the measurement basis information, may be performed by the signal processing circuit 209.

The quantum entangled photon pair generating device 1, the optical frequency dividing filter 2, the 2N-input/2N-output optical switch 3 and the control unit 5 that have been described above can be arranged in a concentrated node or the like of a communication network, as in the form of a central control unit. Thus, it is possible to collectively manage the quantum key sharing process between multi-terminals. In this case, the senders/receivers who perform encryption communication have the quantum key receiving devices $D_1, D_2, \ldots D_{2N}$ only, and it is possible to construct the quantum key distribution system more simply at a reduced cost.

As explained above, according to the multi-terminal quantum key distribution system of the embodiment of the present invention, it is possible to perform quantum key distribution between any two terminals among a plurality of terminals, and it is also possible to simultaneously perform quantum key distribution between a plurality of sets of two terminals.

Modified examples of embodiment

In the above-described embodiment, the configuration is assumed in which the quantum entangled photon pair generating device 1, the optical frequency dividing filter 2, the 2N-input/2N-output optical switch 3 and the control unit 5 are collectively arranged in a node or the like of a communication network, as in the form of a central control unit. However, the multi-terminal quantum key distribution system of the embodiment of the present invention is not limited to the above-described embodiment.

For example, there is no need to share the quantum key between all the 2N users. If there are two groups, i.e., a first group formed of the users 1 to N and a second group formed by the users (N+1) to 2N, and if it is sufficient that the quantum key is shared in each group only, i.e., in the first group or the second group, it is also possible to construct the multi-terminal quantum key distribution system such that two types of wavelength that are allotted to each of the users are prepared as optical frequency dividing filters and two types of N-input/N-output optical switch are also prepared.

Further, the polarization entangled photon pair generating device explained with reference to FIG. 2 and the quantum key receiving device explained with reference to FIG. 3 are merely preferable examples when constructing the multi-terminal quantum key distribution system of the embodiment of the present invention.

Moreover, although the above-described multi-terminal quantum key distribution system is a system that uses polarization entangled photon pairs, it is also possible to construct a similar system using time-bin entangled photon pairs. In order to construct the system using time-bin entangled photon pairs, a time-bin entangled photon pair generating device may be used instead of the quantum entangled photon pair generating device, and the quantum key receiving device shown in FIG. 3 may be changed, as appropriate, corresponding to the time-bin entangled photon pair generating device.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A multi-terminal quantum key distribution system comprising:
   a quantum entangled photon pair generating device;
   an optical frequency dividing filter;
   a 2N-input/2N-output optical switch;
   a 2N number of quantum key receiving devices; and
   a control unit, wherein
   N is an integer of two or more, and f bit/s is an assumed maximum key generation rate of a quantum encryption key,
   the quantum entangled photon pair generating device generates quantum entangled photon pairs having an optical frequency region of at least 2Nf Hz,
   the optical frequency dividing filter has a 2N number of output ports, receives the quantum entangled photon pairs output from the quantum entangled photon pair generating device, divides the optical frequency region by 2N, and outputs photons of the 2N number of optical frequency regions from the 2N number of output ports,
   the 2N-input/2N-output optical switch receives the photons of the 2N number of optical frequency regions output from the 2N number of output ports of the optical frequency dividing filter, allocates each of the photons of the 2N number of optical frequency regions to any one of the 2N number of output ports, and outputs the photons,
   each of the 2N number of quantum key receiving devices includes a signal processing circuit and detects each of the photons of the 2N number of optical frequency regions output from the 2N-input/2N-output optical switch, and the signal processing circuit receives measurement basis information that is sent from the other quantum key receiving devices via a classical channel, sends the measurement basis information to the other quantum key receiving devices via the classical channel, determines time information at which measurement bases of a sender and a receiver match, sends the determined time information to the other quantum key receiving devices via the classical channel, and generates a sifted key by leaving only a photon bit measured at a time at which the measurement bases match, and
   the control unit controls an operation of the 2N-input/2N-output optical switch, and controls a sifted key generation process in each of the quantum key receiving devices through the classical channel.

2. The multi-terminal quantum key distribution system according to claim 1,
   wherein the quantum entangled photon pair generating device includes a loop optical path and an optical branching input/output portion,
   a nonlinear optical medium and a polarization plane/optical phase adjusting portion are arranged in the loop optical path, the polarization plane/optical phase adjusting portion adjusting an optical phase difference between an optical component that rotates clockwise along the loop optical path and an optical component that rotates counter-clockwise of a signal photon and an idler photon which are generated in the nonlinear optical medium based on an excitation photon input to the loop optical path and which propagate in the loop optical path, and
   the optical branching input/output portion inputs the excitation photon to the loop optical path such that the excitation photon propagates clockwise and counter-clockwise in the loop optical path, and outputs, as the quantum entangled photon pair, a correlated photon pair that is formed of the signal photon and the idler photon that propagate clockwise and counter-clockwise in the loop optical path.

3. The multi-terminal quantum key distribution system according to claim 1,
   wherein the optical frequency dividing filter is a wavelength selecting filter that uses an arrayed waveguide grating.

4. The multi-terminal quantum key distribution system according to claim 1,
   wherein each of the quantum key receiving devices includes a half mirror, a first polarization separation element, a (1-1) single photon detector, a (1-2) single photon detector, a second polarization separation element, a (2-1) single photon detector, a (2-2) single photon detector, a ½ wavelength plate and the signal processing circuit,
   arriving photons are probabilistically separated into two optical paths by the half mirror, photons that proceed along one of the optical paths are input to the first polarization separation element, and photons that proceed along the other optical path are caused to pass through the ½ wavelength plate and are input to the second polarization separation element,
   the photons input to the first polarization separation element are probabilistically polarization-separated, s-polarized photons are input to the (1-1) single photon detector and p-polarized photons are input to the (1-2) single photon detector,
   the photons input to the second polarization separation element are probabilistically polarization-separated such that p-polarized photons are input to the (2-1) single photon detector and s-polarized photons are input to the (2-2) single photon detector, and the measurement basis information is acquired in accordance with which of the (1-1) to (2-2) single photon detectors detects the photon.

* * * * *